US 8,660,217 B2

(12) United States Patent
Choi et al.

(10) Patent No.: US 8,660,217 B2
(45) Date of Patent: Feb. 25, 2014

(54) METHODS AND APPARATUS FOR LOW COMPLEXITY SOFT-INPUT SOFT-OUTPUT GROUP DETECTION

(75) Inventors: Jun Won Choi, San Diego, CA (US); Insung Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/288,865

(22) Filed: Nov. 3, 2011

(65) Prior Publication Data

US 2012/0114084 A1 May 10, 2012

Related U.S. Application Data

(60) Provisional application No. 61/410,629, filed on Nov. 5, 2010.

(51) Int. Cl.
*H04L 27/06* (2006.01)
*H03D 1/00* (2006.01)

(52) U.S. Cl.
USPC ............ 375/340; 375/316; 375/324; 375/346

(58) Field of Classification Search
USPC ................... 375/316, 324, 340, 346
See application file for complete search history.

(56) References Cited

U.S. PATENT DOCUMENTS

| 6,898,348 B2* | 5/2005 | Morozov et al. ................ 385/37 |
| 8,009,771 B2* | 8/2011 | Dangi et al. ................. 375/340 |
| 2004/0264561 A1* | 12/2004 | Alexander et al. ............. 375/232 |
| 2008/0317150 A1* | 12/2008 | Alexander et al. ............. 375/260 |
| 2010/0183065 A1 | 7/2010 | Siti et al. |
| 2010/0278034 A9 | 11/2010 | Laroia et al. |
| 2011/0044409 A1 | 2/2011 | Yoshimoto et al. |
| 2011/0051861 A1 | 3/2011 | Yang |

OTHER PUBLICATIONS

De Jong, et al., "Iterative Tree Search Detection for MIMO Wireless Systems," IEEE Trans. Commun., vol. 53, No. 6, Jun. 2005 pp. 930-935.

Hagenauer, et al., "The list-sequential (LISS) algorithm and its application," IEEE Transactions on Communications, vol. 55, No. 5, May 2007, pp. 918-928.

Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).

Jalden J et al: "Parallel Implementation of a Soft Output Sphere Decoder" Signals, Systems and Computers, 2005. Conference Record of the Thirty-Ninth Asilomar Conference on, Pacific Grove, California, IEEE, Piscataway, NJ, USA, Oct. 28, 2005, pp. 581-585, XP010900066.

(Continued)

*Primary Examiner* — Ted Wang
(74) *Attorney, Agent, or Firm* — Patterson & Sheridan, LLP

(57) ABSTRACT

Certain aspects of the present disclosure propose methods and apparatus for low complexity soft-in soft-out detection that divide a plurality of received symbols into a plurality of groups of symbols and performs preprocessing on the symbols in each group to suppress interference from other groups. The preprocessing may utilize a priori information for one or more symbols in one or more groups that are not yet detected, and/or a posteriori information for one or more symbols in one or more groups that are already detected and/or decoded. The preprocessed symbols may then be detected using a soft-in soft-out detection algorithm.

24 Claims, 16 Drawing Sheets

(56) References Cited

OTHER PUBLICATIONS

Studer, Christoph et al: "Soft-output sphere decoding: algorithms and VLSI implementation" IEEE Journal on Selected Areas in Communications, IEEE Service Center, Piscataway, US, vol. 26, No. 2, Feb. 1, 2008, pp. 290-300, XP011200796.

Wang, et al., "Approaching MIMO channel capacity with soft detection based on hard sphere decoding," IEEE Trans. Commun. vol. 54, No. 4, pp. 587-590, Apr. 2006.

Elkhazin A et al: "Group map blast detector", Acoustics, Speech, and Signal Processing, 2004. Proceedings. (ICASSP '04). IEEE International Conference on Montreal, Quebec, Canada May 17-21, 2004, Piscataway, NJ, USA,IEEE, Piscataway, NJ, USA, vol. 4, May 17, 2004, pp. 785-788, XP010718602, DOI : 10.1109/ICASSP.2004. 1326944 ISBN: 978-0-7803-8484-2 Section 3. Detector Design.

International Search Report and Written Opinion—PCT/US2011/059423—ISA/EPO—Feb. 13, 2012.

Jun Won Choi et al: "Improved linear soft-input soft-output detection via soft feedback successive interference cancellation", IEEE Transactions on Communications, IEEE Service Center, Piscataway, NJ. USA, vol. 58, No. 3, Mar. 1, 2010, pp. 986-996, XP011290264, ISSN: 0090-6778, DOI: 10.1109/TCOMM.2010.03.080469 Sections III. Iterative Detection and Decoding (IDD) Section IV . : SIOF V-Blast Detector Section V. Iterative SIOF Algorithm.

Zarikoff B W et al: "An iterative groupwise multiuser detector for overloaded MIMO applications", IEEE Transactions on Wireless Communications, IEEE Service Center, Piscataway, NJ, US, vol. 6, No. 2, Feb. 1, 2007, pp. 443-447, XP011184046, ISSN: 1536-1276, DOI: 10.1109/TWC.2007.05317.

Section II. The IMUD algorithm.

Tu, Yung-Ping et al. (May 2008) "Iterative Multiuser Detection with Soft Interference Cancellation for Multirate MC-CDMA Systems", IEEE Vehicular Technology Conference (VTC Spring 2008), pp. 708-712. DOI: 10.1109/VETECS.2008.156.

\* cited by examiner 6 layers

○ $x_1$

○ $x_2$   $y = Hx + n$
           6x6 system

METHODS AND APPARATUS FOR LOW COMPLEXITY SOFT-INPUT SOFT-OUTPUT GROUP DETECTION

CLAIM OF PRIORITY UNDER 35 U.S.C. §119

The present Application for Patent claims priority to U.S. Provisional Application No. 61/410,629, entitled, "Low complexity soft-input soft-output group detection algorithm," filed Nov. 5, 2010, and assigned to the assignee hereof, which is hereby expressly incorporated by reference herein.

TECHNICAL FIELD

Certain aspects of the present disclosure generally relate to wireless communications and, more particularly, to detection of received symbols.

BACKGROUND

In conventional communication receivers, data symbol detection and channel decoding are performed separately. Recently, iterative detection and decoding (IDD) receivers are introduced to improve the receiver performance. The IDD receiver performs symbol detection and channel decoding iteratively by exchanging soft information that may be expressed in the form of log likelihood ratio (LLR). To realize such IDD receivers, both the symbol detector and the decoder may be implemented in a soft-input soft-output fashion.

While there exists well known low-complexity soft-in soft-out channel decoding algorithms such as max-log-MAP (maximum a posteriori) decoder, implementation of symbol detectors is challenging due to high computational complexity especially for large systems (e.g., MIMO systems with many antennas). For example, complexity of the optimal soft-input soft-output symbol detector (e.g., a posteriori probability (APP) detector) grows exponentially in terms of the size of symbol vector and modulation order. Although there are linear low-complexity symbol detectors such as a linear minimum mean square error (MMSE) detector aiming to reduce the complexity, the performance gap of the linear detectors from the APP detector is known to be nontrivial.

SUMMARY

Certain aspects of the present disclosure provide a method for wireless communications. The method generally includes dividing a plurality of symbols into at least a first and a second group of symbols, preprocessing symbols in the first group to suppress interference from symbols in the second group, wherein the preprocessing utilizes a priori information for the symbols in the second group that are not yet detected, detecting symbols in the first group after preprocessing the symbols in the first group, preprocessing symbols in the second group, wherein the preprocessing utilizes a posteriori information obtained from the detected symbols in the first group, and detecting symbols in the second group after preprocessing the symbols in the second group.

Certain aspects of the present disclosure provide an apparatus for wireless communications. The apparatus generally includes means for dividing a plurality of symbols into at least a first and a second group of symbols, means for preprocessing symbols in the first group to suppress interference from symbols in the second group, wherein the preprocessing utilizes a priori information for the symbols in the second group that are not yet detected, means for detecting symbols in the first group after preprocessing the symbols in the first group, means for preprocessing symbols in the second group, wherein the preprocessing utilizes a posteriori information obtained from the detected symbols in the first group, and means for detecting symbols in the second group after preprocessing the symbols in the second group.

Certain aspects provide a computer-program product for wireless communications, comprising a computer-readable medium having instructions stored thereon, the instructions being executable by one or more processors. The instructions generally include instructions for dividing a plurality of symbols into at least a first and a second group of symbols, instructions for preprocessing symbols in the first group to suppress interference from symbols in the second group, wherein the preprocessing utilizes a priori information for the symbols in the second group that are not yet detected, instructions for detecting symbols in the first group after preprocessing the symbols in the first group, instructions for preprocessing symbols in the second group, wherein the preprocessing utilizes a posteriori information obtained from the detected symbols in the first group, and instructions for detecting symbols in the second group after preprocessing the symbols in the second group.

Certain aspects of the present disclosure provide an apparatus for wireless communications. The apparatus generally includes at least one processor and a memory coupled to the at least one processor. The at least one processor is generally configured to divide a plurality of symbols into at least a first and a second group of symbols, preprocess symbols in the first group to suppress interference from symbols in the second group, wherein the preprocessing utilizes a priori information for the symbols in the second group that are not yet detected, detect symbols in the first group after preprocessing the symbols in the first group, preprocess symbols in the second group, wherein the preprocessing utilizes a posteriori information obtained from the detected symbols in the first group, and detect symbols in the second group after preprocessing the symbols in the second group.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 8A-8E illustrate an example for detecting a plurality of symbols utilizing the proposed SSG detector, in accordance with certain aspects of the present disclosure.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
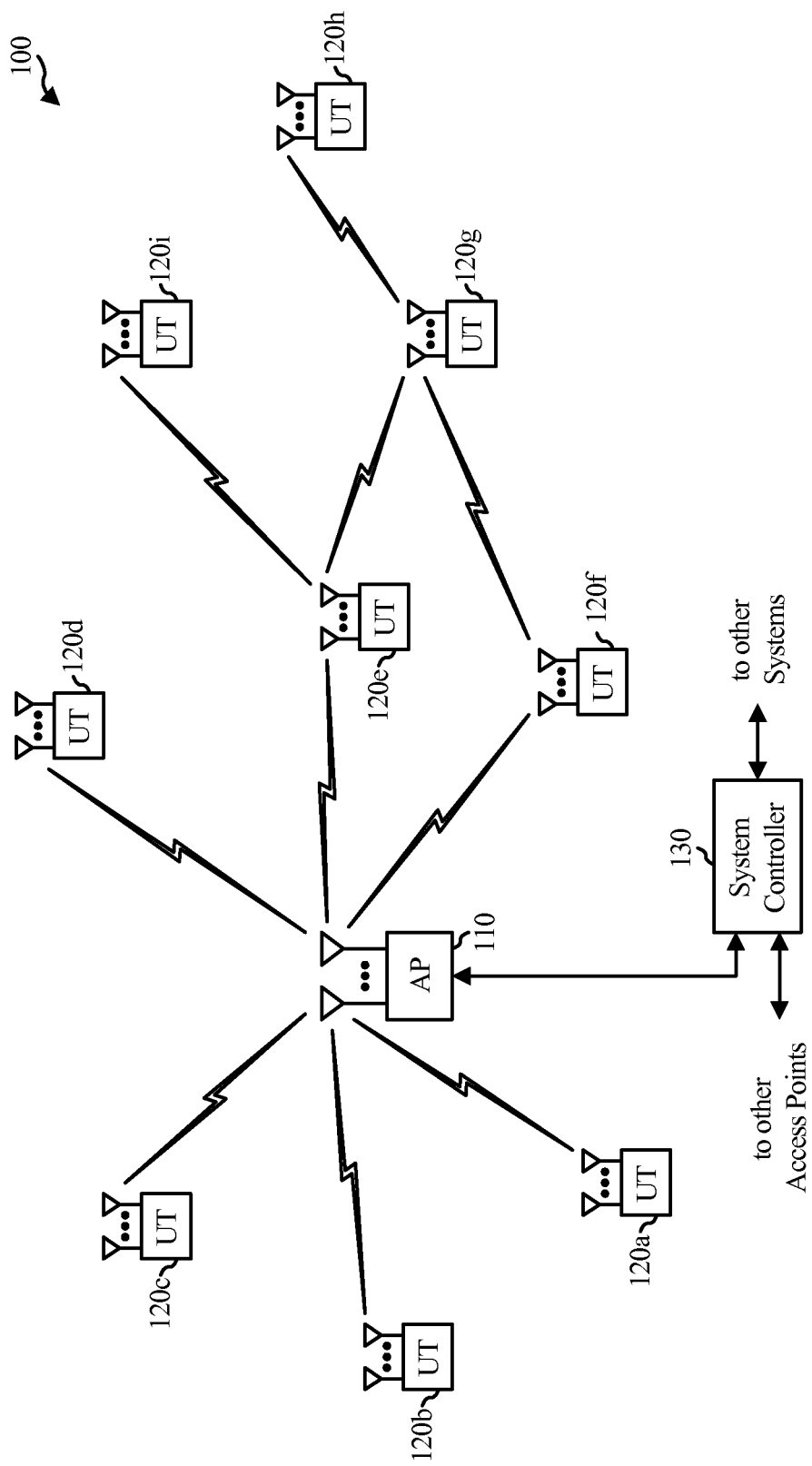
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc. In some aspects, a single-user MIMO system may be employed.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
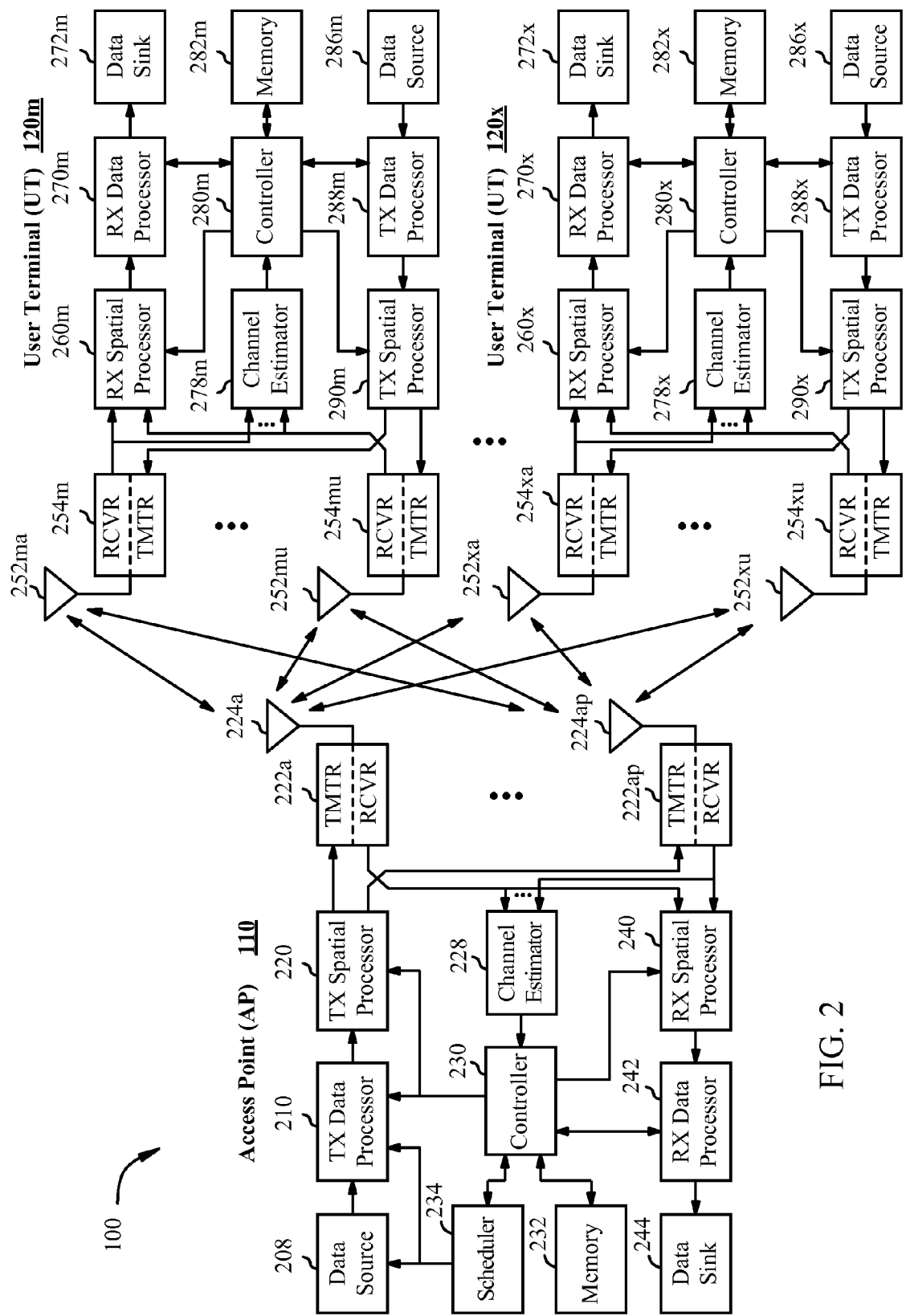
FIG. 2 illustrates a block diagram of an example access point and user terminals, in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280, which may be coupled to a memory 282. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing. The controller 230 may be coupled to a memory 232.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique.

For certain aspects, the receiver may perform receive spatial processing using a soft-in soft-out detector to generate detected symbols, as proposed in the current disclosure. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
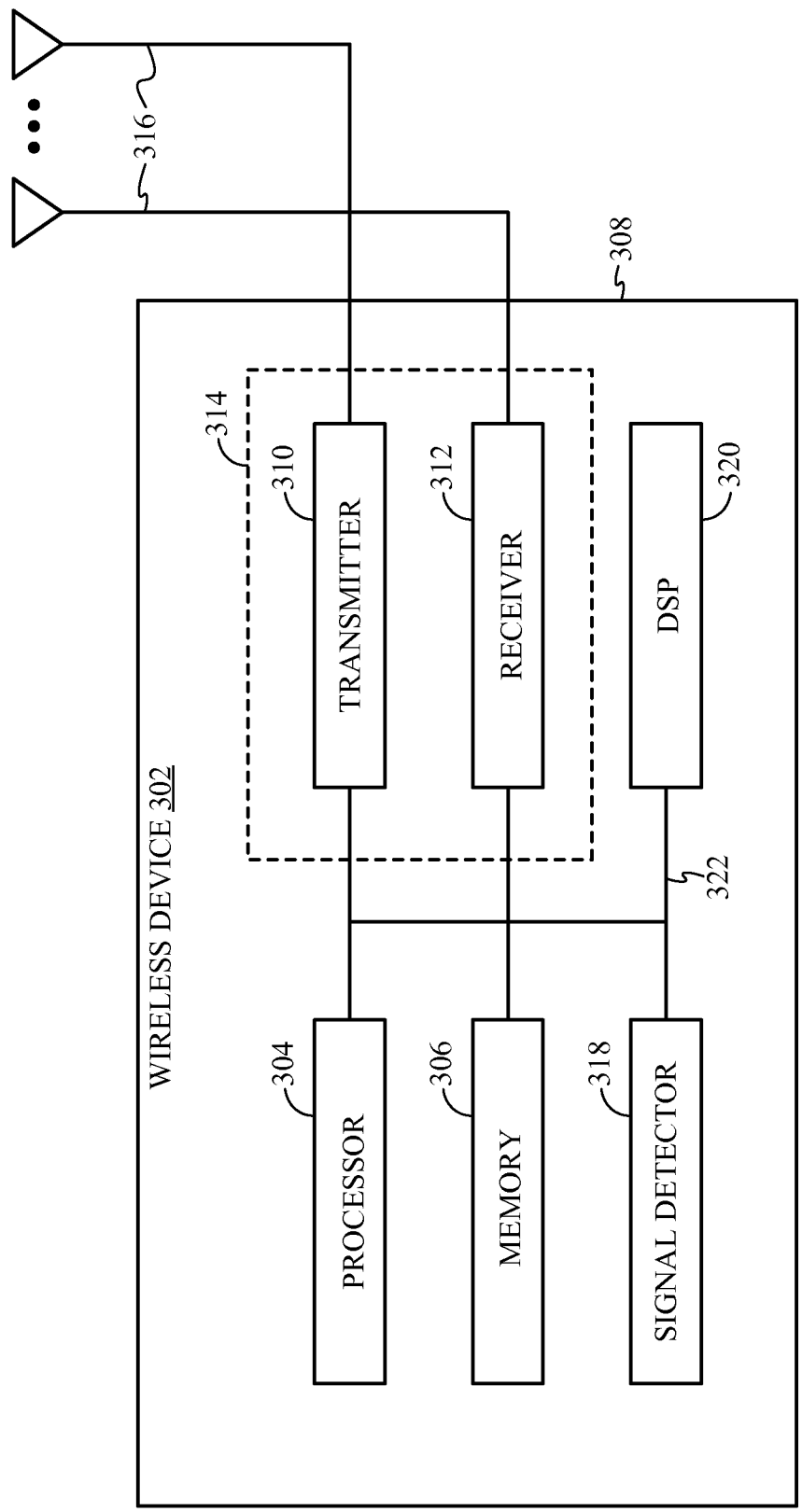
FIG. 3 illustrates a block diagram of an example wireless device, in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The signal detector 318 may utilize an SSG detector as proposed in the current disclosure. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, and combinations thereof.

Examplary Low Complexity Soft-Input Soft-Output
Group Detection Methods and Apparatus Certain aspects of the present disclosure propose a soft-input soft-output group (SSG) detector. The proposed detector divides the transmitted symbols into a plurality of groups, preprocesses the symbols in each group to suppress interference from the other groups, and detects the preprocessed symbols using a detection algorithm (e.g., a nonlinear joint detection algorithm). By grouping the symbols, complexity of the detector (such as a posteriori probability (APP) detector) may significantly be reduced.

Figure 4:
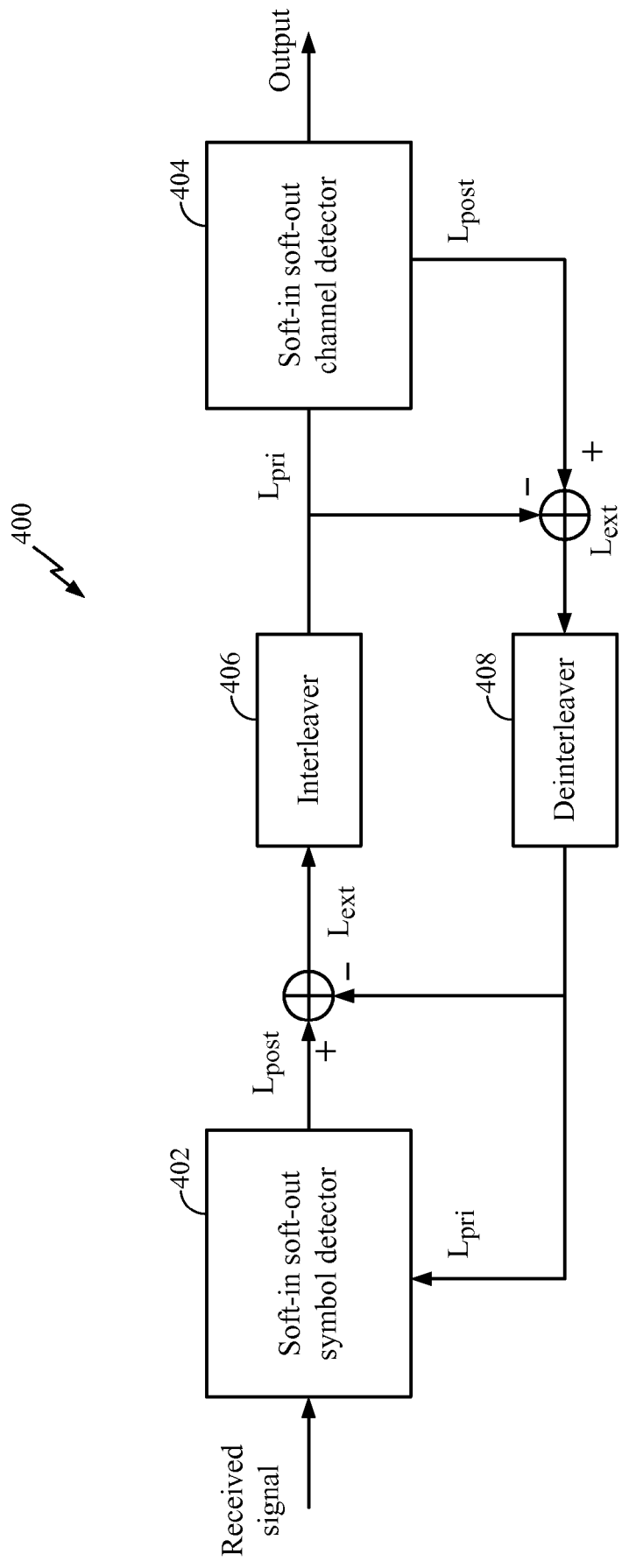
FIG. 4 illustrates a block diagram of an iterative detection and decoding (IDD) receiver, in accordance with certain aspects of the present disclosure.

FIG. 4 illustrates a block diagram 400 of an iterative detection and decoding (IDD) receiver. In the IDD framework, log likelihood ratio (LLR) values may be exchanged between the detector 402 and the decoder 404 in each iteration through the interleaver 406 and/or deinterleaver 408. The LLR values may include $L_{post}$, $L_{pri}$, and $L_{ext}$ that may represent the vectors of a posteriori, a priori, and extrinsic LLRs, respectively. Each element of the vectors $L_{post}$, $L_{pri}$, or $L_{ext}$ may represent a posteriori, a priori, or extrinsic LLR of a particular coded bit, respectively. The coded bits may belong to the transmitted symbol vector. The soft-in soft-out symbol detector 402 may input the received signal and a priori information ($L_{pri}$) about the symbols from a previous iteration of the IDD receiver. The symbol detector may detect the symbols to generate a posteriori LLRs ($L_{post}$). The extrinsic LLRs ($L_{ex}$) may then be generated by subtracting a priori information from the a posteriori information ($L_{ext}=L_{post}-L_{pri}$).

In general, the detector 402 may be a soft-in soft-out detector, such as a posteriori probability (APP) detector, a tree detector or linear minimum least square error (MMSE) detector. In tree detectors (e.g., list sphere detector (LSD)), complexity may grow very rapidly with problem size. Moreover, the tree detectors may have variable complexity and latency resulting in substantial worst-case complexity and latency that may not be desirable for hardware implementation. In addition, the variable complexity may result in inefficient use of hardware resources. QR decomposition may also be used in tree detectors which may be costly in hardware especially for large system sizes. On the other hand, soft-in soft-out detectors with linear structure (e.g., MMSE detector) may have low complexity, with slow performance convergence, and large performance gap from nonlinear joint detectors.

The existing detection methods such as LSD perform reasonably well for small problem sizes such as 2×2 (a MIMO system with two transmit antennas and two receive antennas) or 4×4, with quadrature phase shift keying (QPSK), 16-QAM (Quadrature amplitude modulation) or 64-QAM modulations. But performance and/or complexity of these detection methods may suffer dramatically when problem size grows. Therefore, there is a need for a low-complexity soft-input soft-output joint detector for large systems. The proposed soft input soft output group (SSG) detector may perform as well as or nearly as well as the optimum APP detector while having a complexity similar to the complexity of linear detectors.

For certain aspects, in the proposed SSG detection technique, the received symbols may be divided into several symbol groups before detection. The APP detection (or any soft input soft output nonlinear joint detection algorithm) may be performed on each group successively. A linear pre-processing step may be applied to the symbols in each group before each detection step. The linear preprocessor may suppress the impact of interfering symbol groups (e.g., the symbol groups other than the group of interest) to improve performance of the subsequent detection. For certain aspects, the preprocessor may utilize a posteriori LLRs for suppression of the previously detected groups and a priori LLRs for suppression of the undetected groups of symbols. By applying the linear preprocessor exploiting soft information (e.g., byproduct of the channel decoder), the performance of each group detector may improve significantly with iterations.

The preprocessor may minimize power of interferers according to minimum mean square error (MMSE). In addition, the a posteriori LLRs of the detected symbol groups and the a priori LLRs of the undetected groups may be incorporated into the preprocessor to exploit the decoder output for interference suppression. The preprocessing step followed by APP detection may be repeated successively until all symbol groups are processed.

Figure 5A:
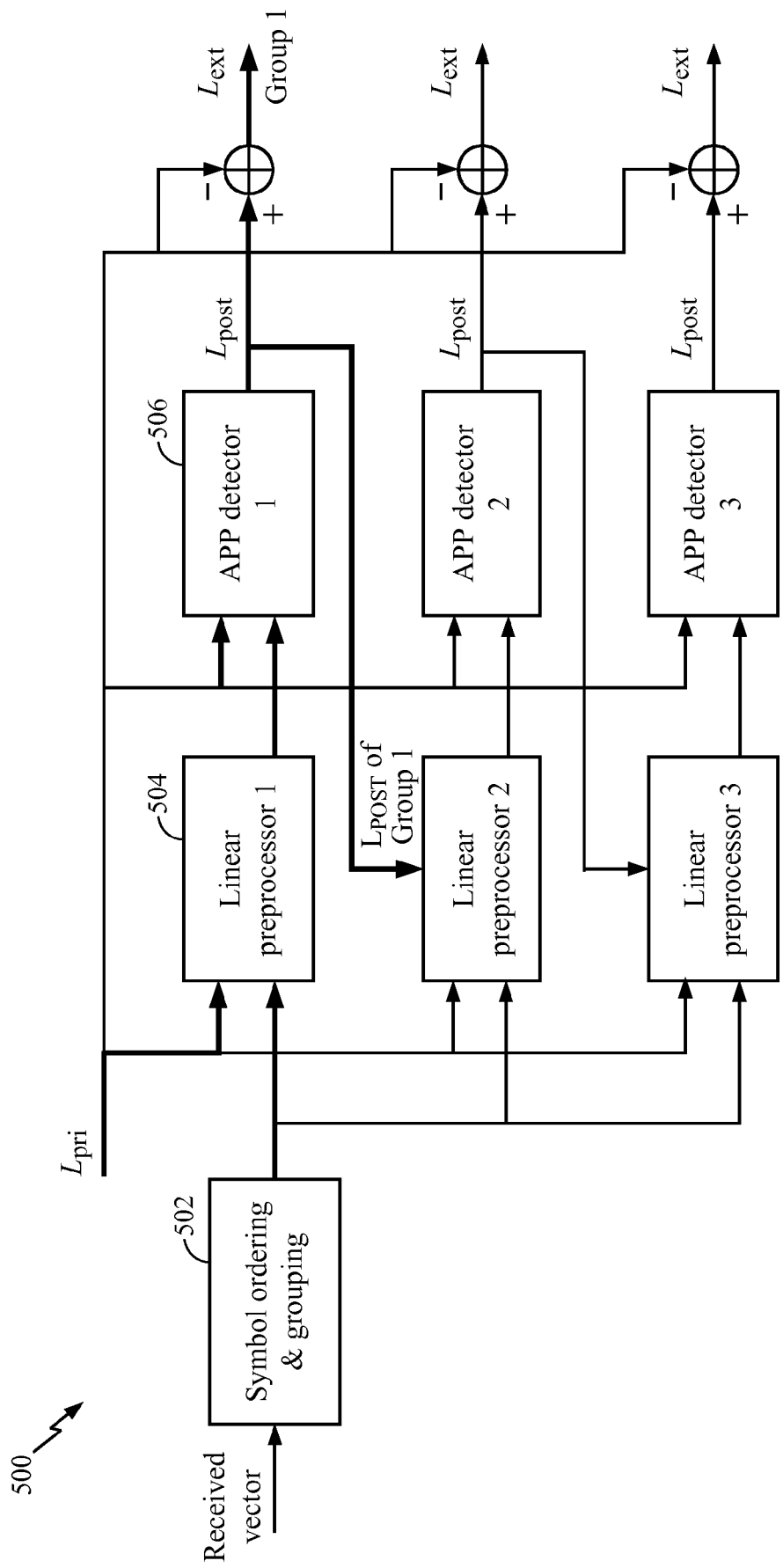
FIGS. 5A-5C illustrate an example structure of a soft-in soft-out group (SSG) detector, in accordance with certain aspects of the present disclosure.
Figure 5B:
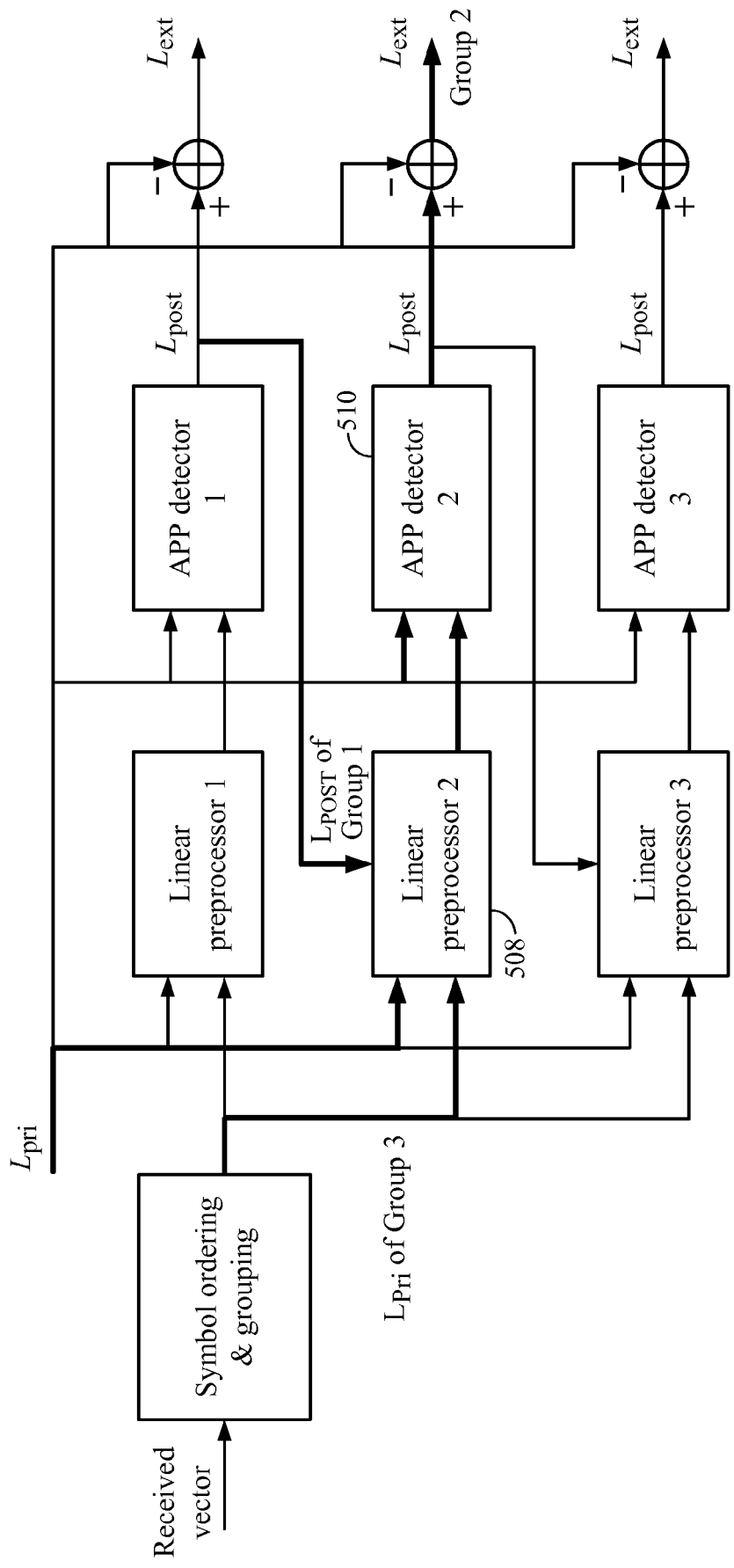
Figure 5C:
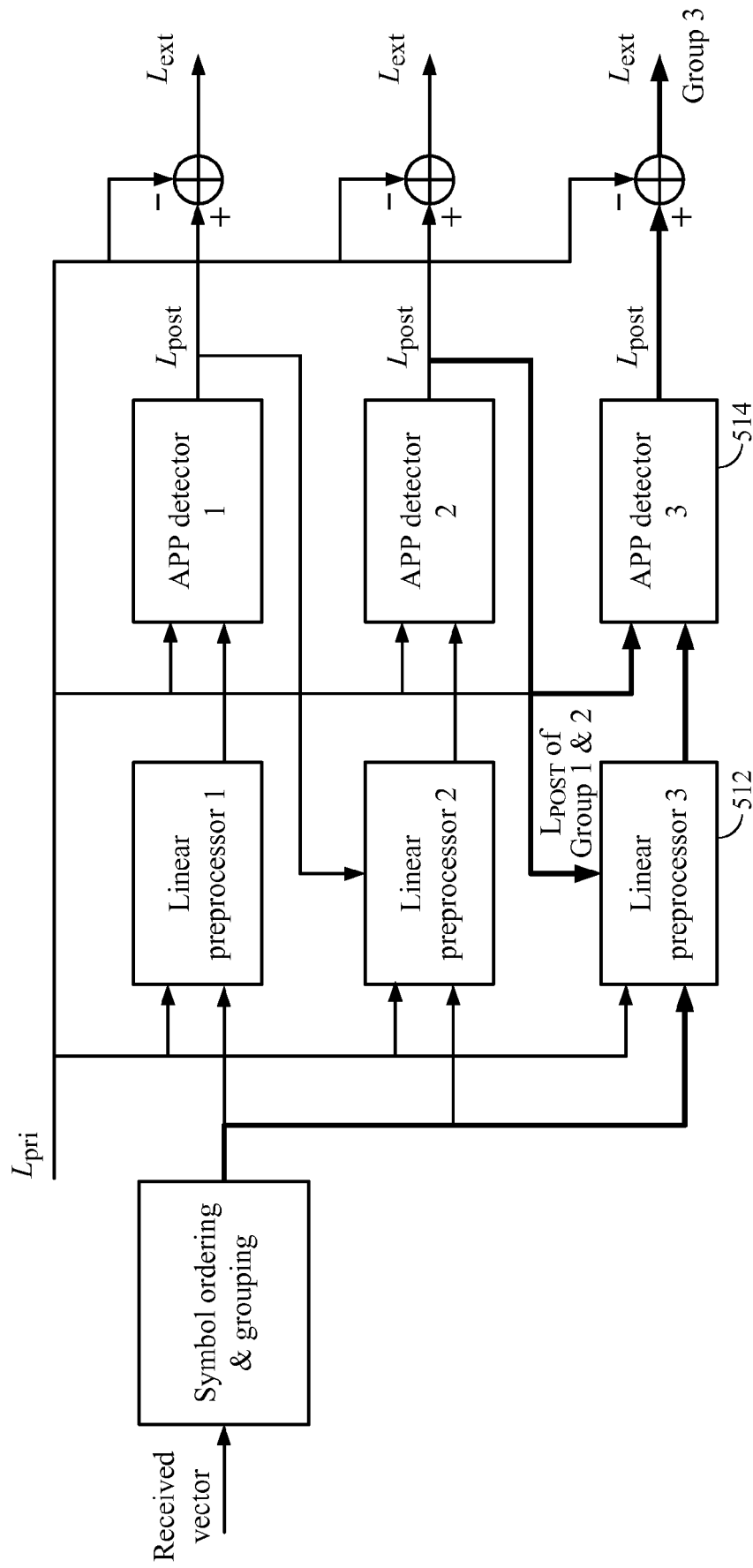

FIGS. 5A-5C illustrate an example structure 500 of the SSG detector, in accordance with certain aspects of the present disclosure. The SSG detector may perform a low-complexity soft-in soft-out detection by combining a linear interference suppression (as pre-processor) with APP group detection. Note that the APP detection algorithm that is used to detect each group is not restricted to any particular algorithm and, in general, the APP algorithm may be replaced with any generic soft-input soft-output nonlinear joint detection algorithm.

As illustrated in FIG. 5A, the symbols in the received vector may be divided into three different groups by symbol ordering and grouping block 502. Each group may pass through a linear preprocessor 504 and an APP detector 506. FIG. 5A shows the first stage, in which symbols from the first group enter a linear pre-processor 504 and an APP detector 506. In this figure, arrows in bold show the movement of parameters in the diagram. The a posteriori LLR values of the detected symbols from the first group may enter the second stage, as illustrated in FIG. 5B. The linear preprocessor 508 may utilize a priori LLR values for the symbols in group 3 and a posteriori LLRs for the detected symbols from the detector 506 in the first stage. The APP detector 510 may use the pre-processed symbols to perform APP detection. Similarly, as shown in FIG. 5C, the linear preprocessor 512 in the third stage may utilize the a posteriori LLR values for the first and/or second group to mitigate the interference caused by these symbols. The preprocessed symbols may then enter the detector 514 for detection. It should be noted that although only three stages are shown in the figure, in general, any number of groups (and hence any number of stages) may be used in the SSG detector.

Figure 6:
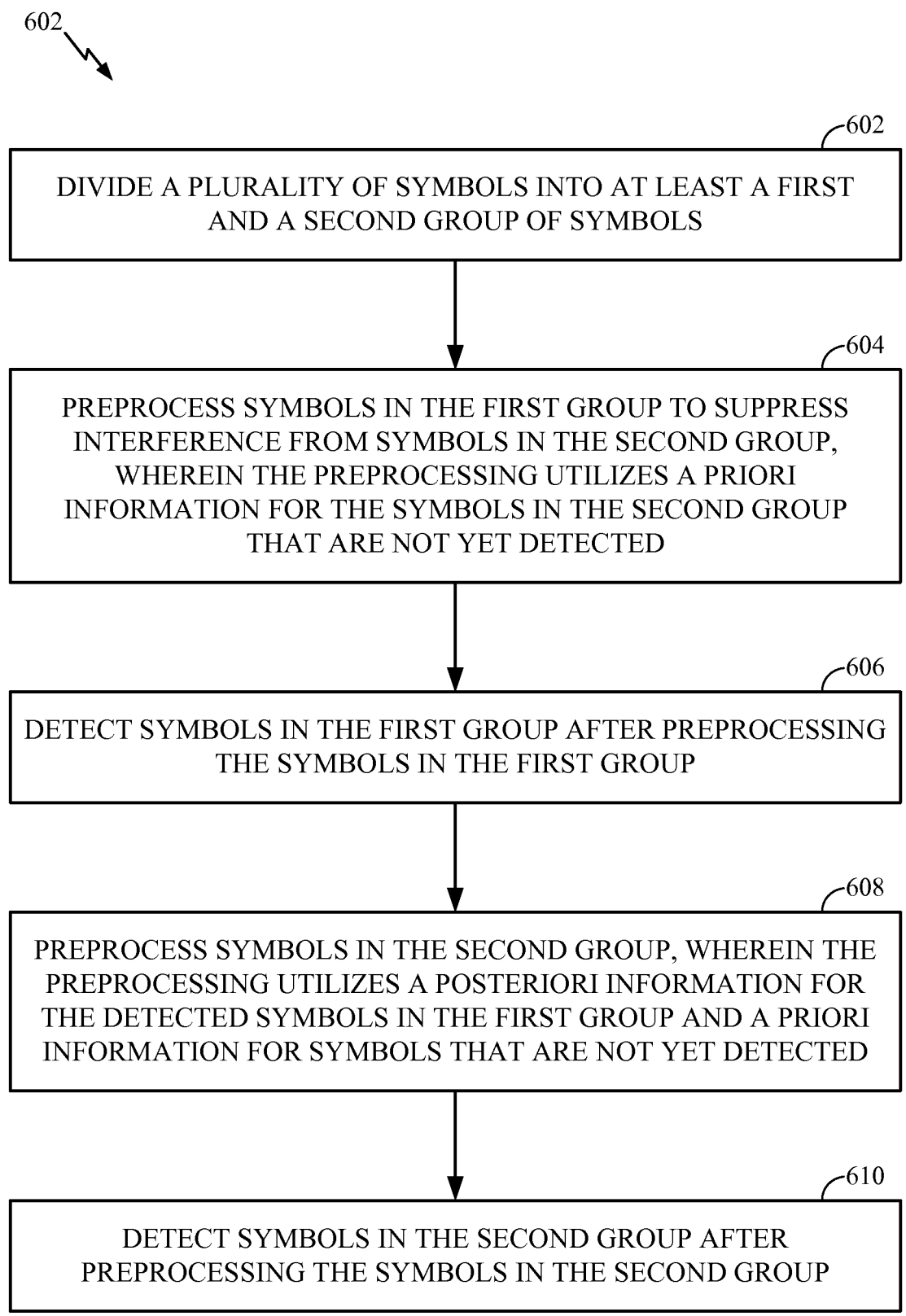
FIG. 6 illustrates example operations for performing SSG detection, in accordance with certain aspects of the present disclosure.

FIG. 6 illustrates example operations 600 for performing SSG detection, in accordance with certain aspects of the present disclosure. At 602, a plurality of symbols may be divided into at least a first and a second group of symbols. For example, the symbols may be sorted and grouped based on their received power. At 604, symbols in the first group may be preprocessed to suppress interference from symbols in the second group. The preprocessing step may utilize a priori information for the symbols in the second group that are not yet detected. At 606, symbols in the first group may be detected after preprocessing the symbols in the first group. At 608, symbols in the second group may be preprocessed. The preprocessing may utilize a posteriori information obtained from the detected symbols in the first group. At 610, the symbols in the second group may be detected after preprocessing the symbols in the second group.

For certain aspects, the plurality of symbols may be divided into a first, second and third group. In this case, preprocessing the symbols in the first and/or the second group suppresses interference from symbols in the third group by utilizing a priori information for the symbols in the third group that are not yet detected. Therefore, preprocessing the symbols in the second group suppresses interference from the symbols in the first group using a posteriori information and suppresses the interference from the third group using a priori information for the symbols in the third group that are not yet detected.

For certain aspects, the SSG detection algorithm may be performed as follows. First, the symbols that are going to be detected may be sorted utilizing an ordering algorithm, such as a vertical Bell-Labs layered space-time (V-BLAST) ordering. The V-BLAST ordering may sort the symbols based on their received power (e.g., post-detection Signal to Noise Ratio (SNR)).

In the next step, the symbols may be divided into a plurality of symbol groups (e.g., 1, . . . , GROUP_NUM, in which GROUP_NUM may represent the number of symbol groups). The number of symbol groups may be determined based on the desired performance and/or complexity of the system. In general, by increasing the number of symbol groups, complexity of the system may be reduced with some performance degradation. As an example, the symbols may be divided into three groups (e.g., GROUP_NUM=3). Therefore, the stronger symbols in the V-BLAST ordering (e.g., the symbols with higher power or higher SNRs than other symbols) may be assigned to the first group; of the remaining symbols, the next stronger symbols with higher power or higher SNRs than other remaining symbols may be assigned to the second group, and so on.

In a subsequent step, a linear preprocessing may be performed to suppress interference caused by symbols in the other groups on the symbols in the group of interest. For example, the linear preprocessor may suppress interference caused by symbol groups 1, . . . , i−1, and i+1, . . . , GROUP_NUM on the symbols in group i, in which i is a loop counter that counts from one to GROUP_NUM. As described earlier, a posteriori LLRs may be used to suppress interference from the symbol groups 1, . . . , i−1 and a priori LLRs may be used to mitigate the interference caused by the symbols in the groups i+1, . . . , GROUP_NUM. In the above notation, the range 1, . . . , 0 means there is no group ahead of the group 1. In general, the range GROUP_NUM+1, . . . , GROUP_NUM means there is no group after the group GROUP_NUM.

In a subsequent step, a nonlinear joint detection algorithm (e.g., APP detection or any approximation or simplification of the APP detection) may be performed to produce extrinsic LLRs for symbol group i. If i<GROUP_NUM, the linear preprocessing and detection may be performed on the next group of symbols (i=i+1). When i is equal to the GROUP_NUM, the extrinsic LLRs obtained for all the symbol groups may be sent out of the detector.

For certain aspects, in an iterative detection decoding framework as illustrated in FIG. 4, the outputs of the detector may be sent to the channel decoder to be processed by the decoder. The decoder may use the soft information that is generated by the detector to decode the symbols and generate another set of updated a priori information for the detector. In a next iteration of the IDD receiver, the SSG detector may use the updated a priori information and detect the symbols based on the new and improved information.

For certain aspects, the detector may perform another iteration of detection by sending outputs of the previous detection iteration back to the detector, and use the soft outputs as updated a priori information for the next iteration of detection. Therefore, symbols in all the groups may be detected in each iteration. As a result, the detection performance may improve after each iteration.

For certain aspect, in the group detection algorithm, the detector (e.g., the APP detector) may process only a subset of the symbols (e.g., a group) at a time, instead of the full set of symbols. Hence, significant complexity reduction may be achieved over the original APP detector that jointly processes all the data symbols.

For certain aspects, the linear preprocessing step may mitigate impact of interferers on the symbol group of interest. Hence, performance gain can be achieved in the subsequent group detection. Since soft information from the decoder may be incorporated into the linear preprocessor, interference suppression capability of the linear preprocessor may be improved in later iterations of the IDD (e.g., including detection and decoding). For example, the linear preprocessor may be able to suppress more interference in the third iteration of the IDD compared to the amount of interference suppressed in the second iteration. This may allow rapid convergence of the system performance with fewer iterations compared to a similar system that does not employ a linear preprocessor.

Generally, there is a trade-off between performance and/or complexity of the SSG detector. For certain aspects, performance and/or complexity of the SSG detector may be adjusted by varying number of groups and hence the number of symbols per each group. For example, by increasing number of groups, number of symbols per each group may be decreased. Therefore, complexity of the APP group detector may be decreased while having similar performance. This implies that the SSG detector can gracefully fill the performance gap between linear detectors (e.g., MMSE) and the APP detector by adjusting number of symbol groups and size of each group. In general, different groups may have similar or different sizes (e.g., include similar number of symbols or different number of symbols). Therefore, the SSG detector may be easily reconfigured depending on various performance/complexity requirements of the system.

The proposed SSG detector may have advantages in hardware implementation. For example, the preprocessing/APP detection process for each stage (e.g., running on a group of symbols) may share the same hardware structure. Hence, parallel structure or hardware-sharing tools may be utilized for efficient implementation.

For certain aspects, the SSG detector may be applied to various receiver systems, including but not limited to frequency selective channel equalization, multi-user detection, multi-input multi-output (MIMO) detection, and inter-carrier/inter-cell interference (ICI) cancellation. In particular, the SSG detector may not be limited to any particular technology and may be used in various wireless standards, such as CDMA, W-CDMA, long term evolution (LTE), Worldwide Interoperability for Microwave Access (WiMAX) and the like.

Figure 7:
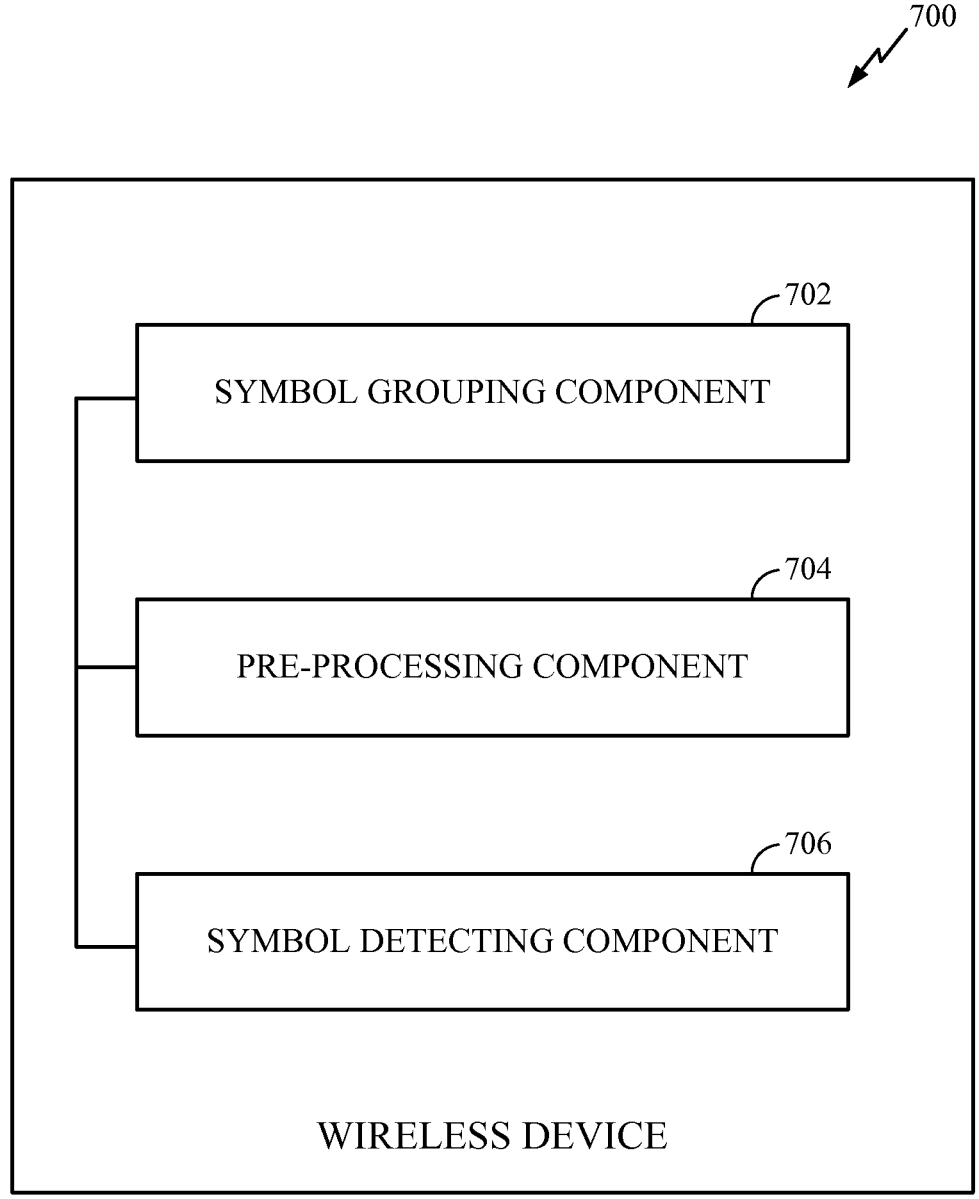
FIG. 7 illustrates an example wireless device capable of performing the proposed SSG detection algorithm, in accordance with certain aspects of the present disclosure.

FIG. 7 illustrates an example wireless device 700 capable of performing the proposed SSG detection algorithm. The wireless device may include a symbol grouping component 702 for dividing a plurality of received symbols into a plurality of groups of symbols. The wireless device may also include a pre-processing component 704 for preprocessing the symbols in the plurality of groups. The wireless device may also include a symbol detecting component 706 for detecting the symbols in each group.

Figure 8A:
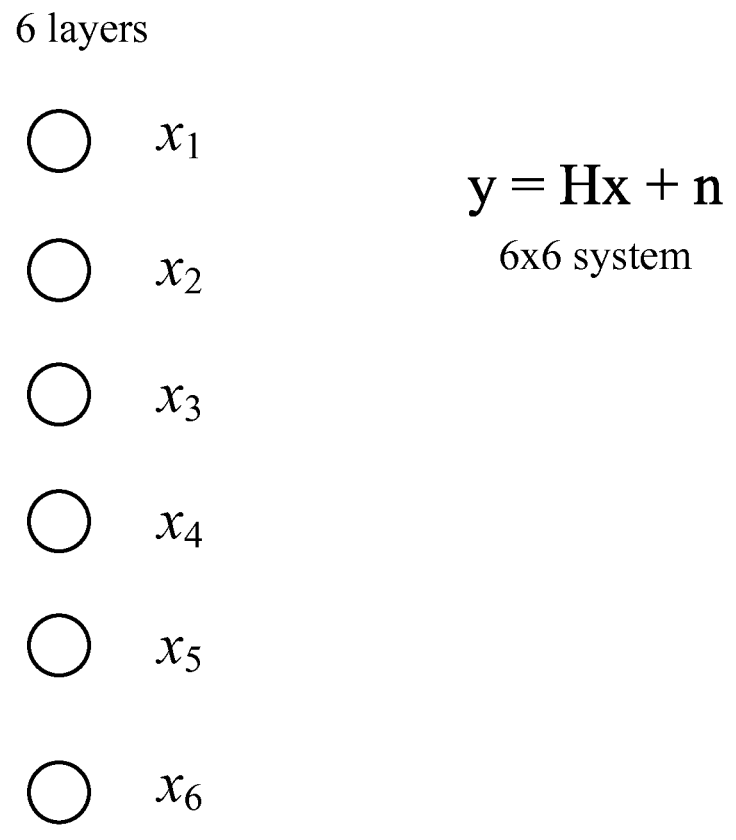
Figure 8B:
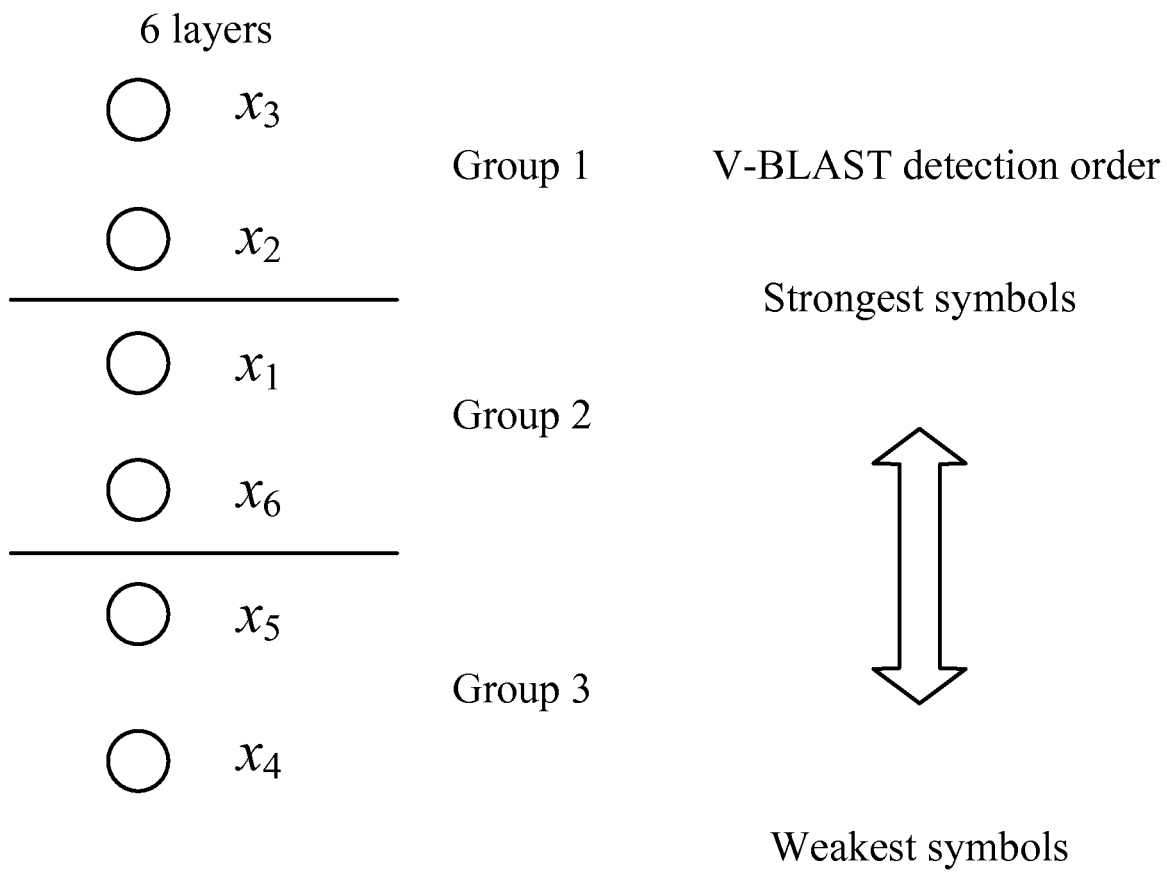

FIGS. 8A-8E illustrate an example detection of a plurality of symbols utilizing the proposed SSG detector. As illustrated in FIG. 8A, a 6×6 multiple antenna system is considered. Assuming that 6 symbols $x_1, \ldots, x_6$ are received, these symbols may be divided into three groups, as illustrated in FIG. 8B.

Figure 8C:
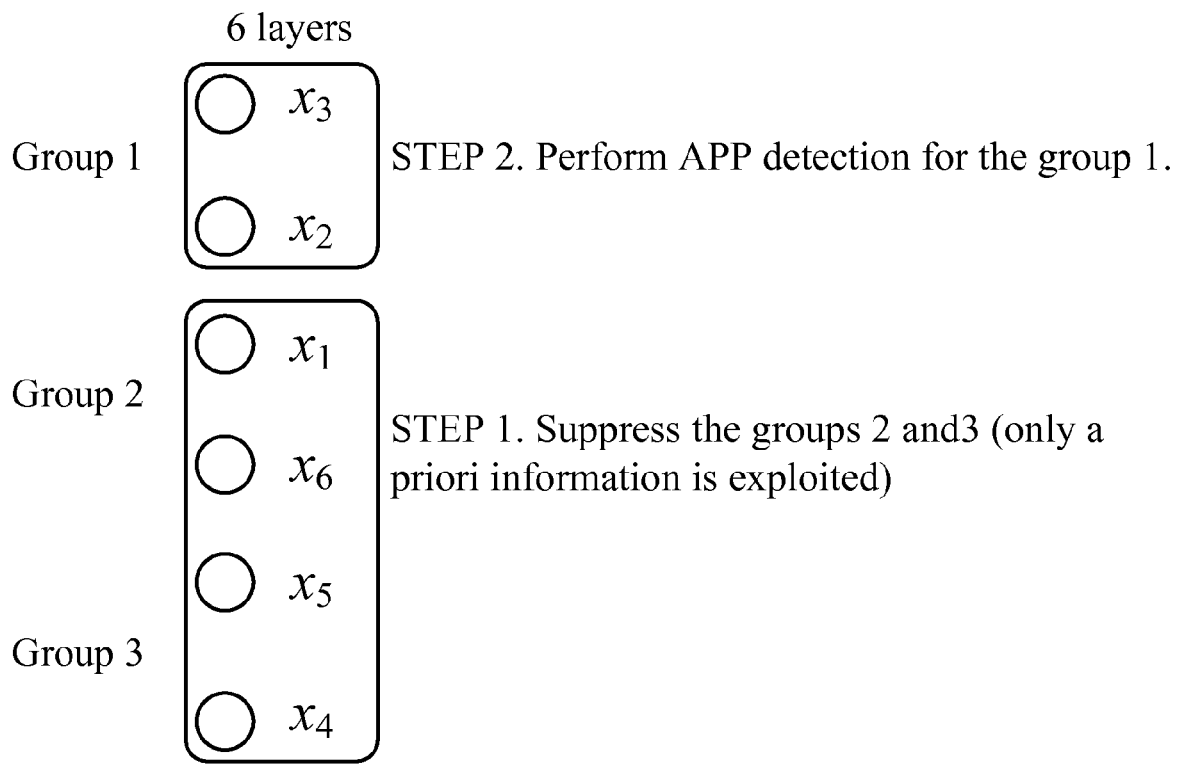

FIG. 8C illustrates a first stage of the group detection that may be performed by preprocessing the symbols in the first group. The preprocessing may include suppressing the interference from the second and third groups (e.g., group 2 and group 3) using a priori information (since the symbols are not yet detected). A nonlinear joint detection may then be performed on the preprocessed symbols of the first group (e.g., group 1).

Figure 8D:
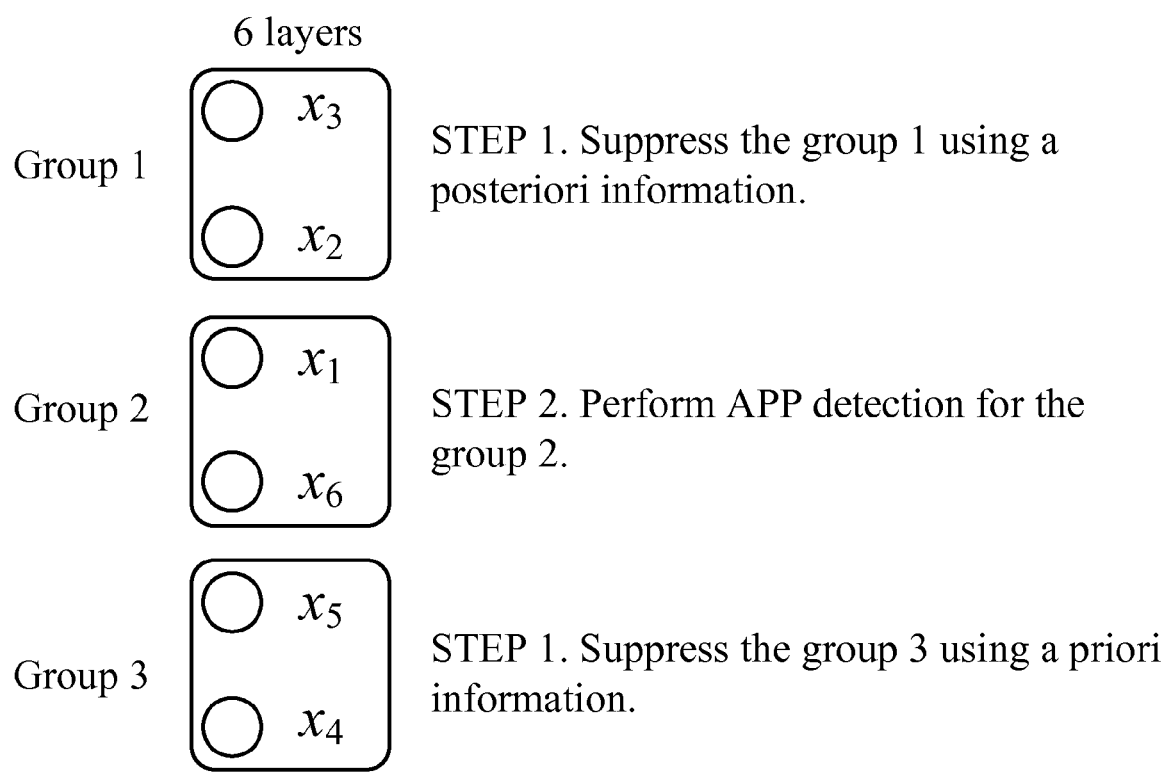

FIG. 8D illustrates a second stage of the group detection algorithm that may be performed by preprocessing the symbols in the second group. The preprocessing may include suppressing the interference from the symbols in the first group on the symbols in the second group using a posteriori information (e.g., the information which is available from detection and/or decoding of the symbols in the first group). The preprocessing may also suppress the interference from the symbols in the third group using their corresponding a priori information. The symbols in the second group may then be detected using the preprocessed symbols.

Figure 8E:
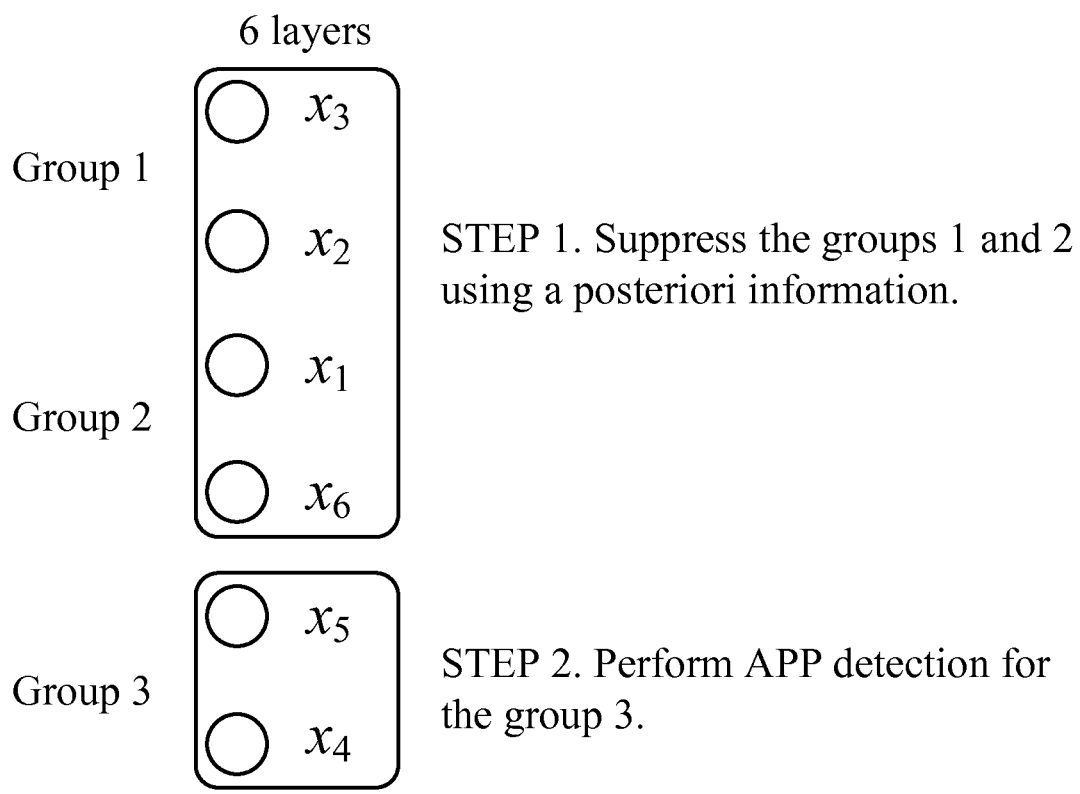

FIG. 8E illustrates a third stage of the group detection algorithm that may be performed by suppressing the interference from the first and second groups using a posteriori information, and performing APP detection on the symbols in the third group.

Figure 9:
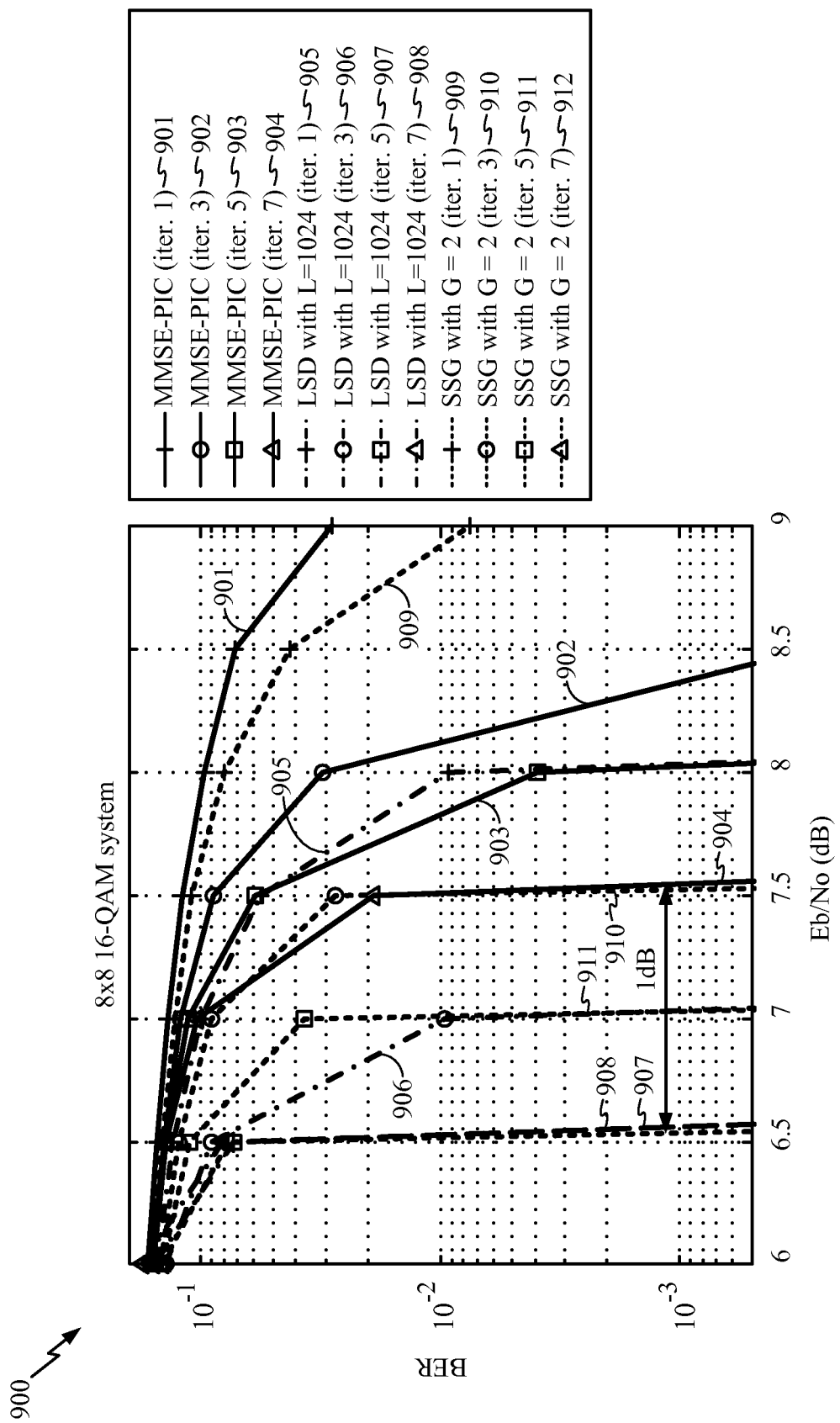
FIG. 9 illustrates simulation results for the proposed soft input soft output group (SSG) detection algorithm compared to existing solutions, in accordance with certain aspects of the present disclosure.

FIG. 9 illustrates simulation results 900 for the proposed SSG detection algorithm compared to existing solutions such as list sphere detection (LSD) and MMSE-PIC (parallel interference cancellation) algorithms. The following parameters are used in the simulations: 8×8 Rayleigh fading channel, 16-QAM (Quadrature amplitude modulation), frame size equal to 12000 bits, IDD receiver with half rate memory-2 turbo code, perfect channel state information (CSI) at receiver. Number of symbol groups (G) is equal to two. Bit error rate (BER) is shown with respect to $E_b/N_0$ (energy per bit to noise power spectral density ratio).

As illustrated, the curves 901, 902, 903 and 904 illustrate simulation results for MMSE-PIC detector using one, three, five and seven iterations, respectively. Curves 905, 906, 907 and 908 illustrate simulation results for LSD detector with list size of 1024 using one, three, five and seven iterations, respectively. And curves 909, 910, 911 and 912 illustrate simulation results for a system using the proposed SSG detector using one, three, five and seven iterations, respectively.

Figure 10:
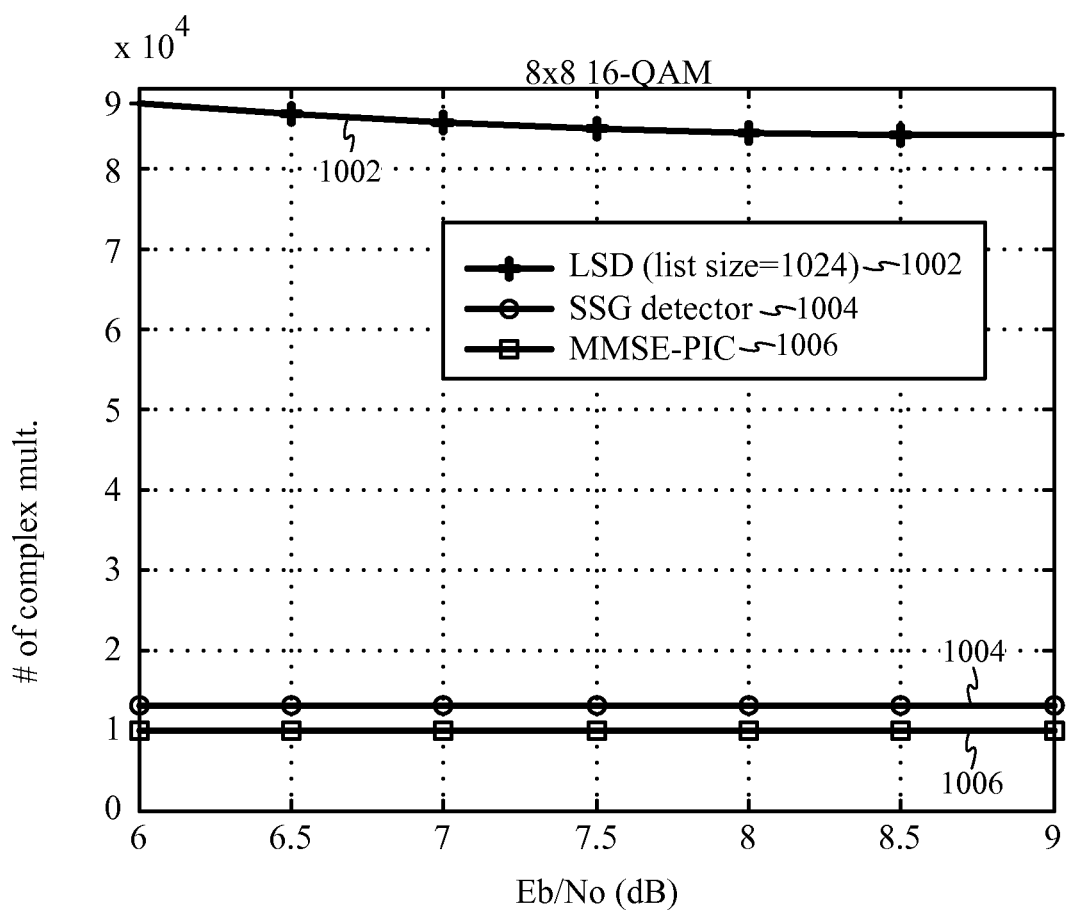
FIG. 10 illustrates complexity comparison of the proposed SSG detection algorithm compared to existing solutions, in accordance with certain aspects of the present disclosure.

It can be seen that the performance of the IDD receiver utilizing the SGG decoder is superior to the performance of the MMSE detector with similar number of iterations. Also, the proposed SSG detector shows close to one decibel (dB) performance improvement in a BER=$10^{-3}$ compared to the MMSE detector with comparable complexity as shown in FIG. 10. In addition, the SSG detector has a performance similar to the LSD detector with a fraction of the complexity of the LSD detector.

FIG. 10 illustrates complexity comparison 1000 of the proposed SSG algorithm compared to other known detection algorithms. The simulation parameters are similar to the systems described in FIG. 9. The curves show number of multiplications in each channel use for each algorithm. Curve 1002 illustrates the number of multiplications in each channel use for LSD detector with a list size of 1024. Curve 1004 illustrates number of multiplications in each channel use for SSG detector and curve 1006 illustrates number of multiplications in each channel use for MMSE-PIC detector. As illustrated, complexity of the SSG detector is comparable with the complexity of the MMSE detector while having superior performance.

As illustrated in FIGS. 9 and 10, for an 8×8 16-QAM MIMO system, the SSG detector achieves 80 percent reduction in complexity (in terms of number of multiplications) over the LSD detector while having similar performance. The SSG detector provides one dB performance gain over the MMSE-PIC detector with comparable complexity. Therefore, the proposed SSG detector achieves strong performance-complexity trade-off.

For certain aspects, the SSG detection may be performed using a communication system as follows:

$$y = Hx + n$$
$$= H_a x_a + (H_c x_c + H_n x_n + n),$$

and $$x = \begin{bmatrix} x_c \\ x_a \\ x_n \end{bmatrix},$$

where y represents the received signal, H represents the channel between the transmitter and the receiver, x represents the transmitted symbols, and n represents the noise. $x_c$ represents transmitted symbols in other groups that are detected, $x_n$ represents transmitted symbols in other groups that are not detected, and $x_a$ represents transmitted symbols in the group of interest. $H_c x_c$ shows the interference caused by the detected symbols, and $H_n x_c$ shows the interference caused by the undetected symbols.

Preprocessing received symbols in each group utilizing a linear suppression scheme may be performed by subtracting and suppressing interference from other groups as follows:

$$q = Z(y - H_c \bar{x}_c^{post} - H_n \bar{x}_n^{pri})$$
$$= Z(H_a x_a + H_c(x_c - \bar{x}_c^{post}) + H_n(x_n - \bar{x}_n^{pri}) + n)$$

where q is the output of the linear preprocessor after inference suppression, $\bar{x}_c^{post}$ is a mean estimate of $x_c$ derived from a posteriori information, and $\bar{x}_n^{pri}$ is a mean estimate of $x_n$ derived from a priori information, and Z is the linear MMSE operator that suppresses the effect of $H_c(x_c - \bar{x}_c^{post})$ and $H_n(x_n - \bar{x}_n^{pri})$.

The Linear MMSE operator Z may also be written as follows:

$$Z = (H_a H_a^H + \sigma_n^2 I)(H_a H_a^H + H_c \Lambda_{post} H_c^H + H_n \Lambda_{pri} H_n^H + \sigma_n^2 I)^{-1}$$

where $\Lambda_{post}$ is a second order statistic, $\sigma_n^2$ represents variance of noise, $(\bullet)^H$ represents the Hermitian operator, and I is an identity matrix.

The APP detection may be performed on the preprocessed symbols by applying a nonlinear joint detector, as follows:

$$q = Z(y - H_c \bar{x}_c^{post} - H_n \bar{x}_n^{pri})$$
$$= Z H_a x_a + Z(H_c(x_c - \bar{x}_c^{post}) + H_n(x_n - \bar{x}_n^{pri}) + n)$$

assuming that residual interference and noise is Gaussian, and calculating the following conditional probability:

$$Pr(q \mid x_a) = C \exp(-(q - Z H_a x_a)(Z(H_c \Lambda_{post} H_c^H + H_n \Lambda_{pri} H_n^H + \sigma_n^2 I) Z^H)^{-1}(q - Z H_a x_a)^H)$$
$$= C \exp(-(y' - H_a x_a)(H_c \Lambda_{post} H_c^H +$$

-continued $$H_n\Lambda_{pri}H_n^H + \sigma_n^2 I)^{-1}(y' - H_a x_a)^H)$$

$$= C\exp\left(-\frac{1}{\sigma^2}\|Q^{-1/2}y' - Q^{-1/2}H_a x_a\|^2\right)$$

$y'=y-H_c\bar{x}_c^{post}-H\bar{x}_c^{pri}$ and $Q=I+1/\sigma_n^2 H_c\Lambda_{post}H_c^H+1/\sigma_n^2 H_n\Lambda_{pri}H_n^H$ and C is a constant.

The output of the APP detection (or a posteriori LLR for the $k^{th}$ coded bit ($c_k$) may be written as follows:

$$L_{post,k} = \ln\frac{Pr(c_k=1\mid q)}{Pr(c_k=0\mid q)}$$

$$= \ln\frac{\sum_{X_a^1} Pr(q\mid x_a)Pr(x_a)}{\sum_{X_a^0} Pr(q\mid x_a)Pr(x_a)}$$

$$= \ln\frac{\sum_{X_k^1}\exp\left(-\frac{1}{\sigma_n^2}\|Q^{-1/2}y' - Q^{-1/2}H_a x_a\|^2 + \sum_i \frac{1}{2}(2c_i-1)L_{pri,i}\right)}{\sum_{X_k^0}\exp\left(-\frac{1}{\sigma_n^2}\|Q^{-1/2}y' - Q^{-1/2}H_a x_a\|^2 + \sum_i \frac{1}{2}(2c_i-1)L_{pri,i}\right)}$$

where $X_k^0=\{x_a:c_k=0\}$, $X_k^1=\{x_a:c_k=1\}$, $c_i$ is the $i^{th}$ coded bit comprising the symbol vectors $x_a$, and $L_{pri,i}$ is the a priori LLR of $c_i$. With the observation $Q^{-1/2}y'$ and the system matrix $Q^{-1/2}H_a$, the above expression is a standard form of a posteriori probability. Hence, nonlinear joint detection algorithm can be directly applied to the results of linear preprocessing, e.g., $Q^{-1/2}y'$, and $Q^{-1/2}H_a$. The extrinsic LLR of $c_k$ may also be derived as follows:

$$L_{ext,k}=L_{post,k}-L_{pri,k}.$$

For each group detection, the linear preprocessing step may be performed as follows:

$$y''Q^{-1/2}y'=(I+1/\sigma_n^2 H_c\Lambda_{post}H_c^H+1/\sigma_n^2 H_n\Lambda_{pri}H_n^H)^{-1/2}(y-H\bar{x}_c^{post}-H_n\bar{x}_n^{pri})$$

$$H'_a=Q^{-1/2}H_a=(I+1/\sigma_n^2 H_c\Lambda_{post}H_c^H+1/\sigma_n^2 H_n\Lambda_{pri}H_n^H)^{-1/2}H_a$$

Next, the APP detection for the group may be performed on $y''$ and $H_a'$.

In sufficiently good signal to interference plus noise (SINR) conditions, the soft information from channel decoder may get more reliable with iterations. With more reliable LLR values, $\bar{x}_c^{post}$ and $\bar{x}_n^{pri}$ may approach the actual transmitted symbols $x_c$ and $x_n$, respectively. In addition, Q may get closer to I as $\Lambda_{post}$ and $\Lambda_{pri}$ approach zero. As a result, $y''$ may approach a clean signal (e.g., $H_a x_a + n$) whose interfering terms are removed perfectly.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in figures, those operations may have corresponding counterpart means-plus-function components with similar numbering.

For example, means for dividing symbols into groups may comprise any suitable type of dividing component, such as the symbol grouping component 702, means for pre-processing groups may comprise any suitable type of processing component, such as the pre-processing component 704, means for detecting groups may comprise any suitable type of detecting component, such as the symbol detecting component 706. These components may be implemented with any suitable components, such as one or more processors, for example, such as the RX spatial processor 260 or the RX data processor 270 in user terminal 120 illustrated in FIG. 2.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

As described herein, means for dividing a plurality of symbols into groups may comprise any suitable circuit or processor, such as the symbol grouping component 702 as illustrated in FIG. 7. Means for preprocessing may comprise any suitable circuit or processor, such as the preprocessing component 704. Means for detecting may comprise may comprise any suitable circuit or processor, such as the symbol detecting component 706. Means for sorting, and means for decoding may comprise any suitable circuit or processor, such as the RX data processors 240 or 270 as illustrated in FIG. 2.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

The invention claimed is:

1. A method, performed by an apparatus, for wireless communications, comprising:
    dividing a plurality of symbols into at least a first and a second group of symbols;
    preprocessing symbols in the first group to suppress interference from symbols in the second group, wherein the preprocessing utilizes a priori information for the symbols in the second group that are not yet detected;
    detecting symbols in the first group after preprocessing the symbols in the first group;
    preprocessing symbols in the second group, wherein the preprocessing utilizes a posteriori information obtained from the detected symbols in the first group; and
    detecting symbols in the second group after preprocessing the symbols in the second group.

2. The method of claim 1, wherein dividing the plurality of symbols into at least the first and the second group of symbols comprises dividing the plurality of symbols into the first, the second and a third group of symbols, wherein preprocessing the symbols in the first and the second group suppresses interference from symbols in the third group by utilizing a priori information for the symbols in the third group that are not yet detected.

3. The method of claim 1, wherein:
    dividing the plurality of symbols into at least the first and the second group of symbols comprises dividing the plurality of symbols into the first, the second and a third group of symbols; and
    preprocessing symbols in the second group utilizes a priori information for the symbols in the third group that are not yet detected.

4. The method of claim 1, further comprising:
    sorting the plurality of symbols;
    wherein dividing the plurality of symbols into at least the first and the second group of symbols comprises dividing the plurality of symbols into at least the first and the second group of symbols based on the sorting.

5. The method of claim 4, wherein the symbols are sorted based on Vertical Bell-Labs Layered Space-Time (V-BLAST) ordering.

6. The method of claim 4, wherein the first group comprises a plurality of symbols that are received with at least one of a higher power or a higher post-detection Signal to Noise Ratio (SNR) than that of symbols in other groups.

7. The method of claim 1, wherein detecting comprises utilizing a soft-input soft-output detector.

8. The method of claim 1, wherein dividing the plurality of symbols into at least the first and the second group of symbols comprises:
    dividing the plurality of symbols into a number of groups of symbols based at least on performance or complexity requirements of a system.

9. The method of claim 1, further comprising:
decoding the detected symbols in the first and the second groups using a soft input soft output decoder to generate updated a priori information to be used in a next iteration.

10. The method of claim 9, further comprising:
preprocessing the symbols in the first group to suppress interference from symbols in the second group, wherein the preprocessing utilizes updated a priori information for the symbols in the second group;
detecting symbols in the first group after preprocessing the symbols in the first group using the updated a priori information for the symbols in the second group;
preprocessing symbols in the second group, wherein the preprocessing utilizes a posteriori information obtained from the symbols detected in the first group after preprocessing the symbols in the first group using the updated a priori information for the symbols in the second group; and
detecting symbols in the second group after preprocessing the symbols in the second group utilizing the a posteriori information obtained from the symbols detected in the first group after preprocessing the symbols in the first group using the updated a priori information for the symbols in the second group.

11. The method of claim 1, wherein detecting symbols comprises detecting symbols using nonlinear detection techniques.

12. An apparatus for wireless communications, comprising:
means for dividing a plurality of symbols into at least a first and a second group of symbols;
means for preprocessing symbols in the first group to suppress interference from symbols in the second group, wherein the preprocessing utilizes a priori information for the symbols in the second group that are not yet detected;
means for detecting symbols in the first group after preprocessing the symbols in the first group;
means for preprocessing symbols in the second group, wherein the preprocessing utilizes a posteriori information obtained from the detected symbols in the first group; and
means for detecting symbols in the second group after preprocessing the symbols in the second group.

13. The apparatus of claim 12, wherein the means for dividing the plurality of symbols into at least the first and the second group of symbols comprises means for dividing the plurality of symbols into the first, the second and a third group of symbols, wherein preprocessing the symbols in the first and the second group suppresses interference from symbols in the third group by utilizing a priori information for the symbols in the third group that are not yet detected.

14. The apparatus of claim 12, wherein:
the means for dividing the plurality of symbols into at least the first and the second group of symbols comprises means for dividing the plurality of symbols into the first, the second and a third group of symbols; and
means for preprocessing symbols in the second group utilizes a priori information for the symbols in the third group that are not yet detected.

15. The apparatus of claim 12, further comprising:
means for sorting the plurality of symbols;
wherein the means for dividing the plurality of symbols into at least the first and the second group of symbols comprises means for dividing the plurality of symbols into at least the first and the second group of symbols based on the sorting.

16. The apparatus of claim 15, wherein the symbols are sorted based on Vertical Bell-Labs Layered Space-Time (V-BLAST) ordering.

17. The apparatus of claim 16, wherein the first group comprises a plurality of symbols that are received with at least one of a higher power or a higher post-detection Signal to Noise Ratio (SNR) than that of symbols in other groups.

18. The apparatus of claim 12, wherein the means for detecting comprises means for utilizing a soft-input soft-output detector.

19. The apparatus of claim 12, wherein the means for dividing the plurality of symbols into at least the first and the second group of symbols comprises:
means for dividing the plurality of symbols into a number of groups of symbols based at least on performance or complexity requirements of a system.

20. The apparatus of claim 12, further comprising:
means for decoding the detected symbols in the first and the second groups using a soft input soft output decoder to generate updated a priori information to be used in a next iteration.

21. The apparatus of claim 20, further comprising:
means for preprocessing the symbols in the first group to suppress interference from symbols in the second group, wherein the preprocessing utilizes updated a priori information for the symbols in the second group;
means for detecting symbols in the first group after preprocessing the symbols in the first group using the updated a priori information for the symbols in the second group;
means for preprocessing symbols in the second group, wherein the preprocessing utilizes a posteriori information obtained from the symbols detected in the first group after preprocessing the symbols in the first group using the updated a priori information for the symbols in the second group; and
means for detecting symbols in the second group after preprocessing the symbols in the second group utilizing the a posteriori information obtained from the symbols detected in the first group after preprocessing the symbols in the first group using the updated a priori information for the symbols in the second group.

22. The apparatus of claim 12, wherein the means for detecting symbols comprises means for detecting symbols using nonlinear detection techniques.

23. A computer-program product for wireless communications, comprising a non-transitory computer readable medium having instructions stored thereon, the instructions being executable by one or more processors and the instructions comprising:
instructions for dividing a plurality of symbols into at least a first and a second group of symbols;
instructions for preprocessing symbols in the first group to suppress interference from symbols in the second group, wherein the preprocessing utilizes a priori information for the symbols in the second group that are not yet detected;
instructions for detecting symbols in the first group after preprocessing the symbols in the first group;
instructions for preprocessing symbols in the second group, wherein the preprocessing utilizes a posteriori information obtained from the detected symbols in the first group; and
instructions for detecting symbols in the second group after preprocessing the symbols in the second group.

24. An apparatus for wireless communications, comprising at least one processor configured to:
- divide a plurality of symbols into at least a first and a second group of symbols,
- preprocess symbols in the first group to suppress interference from symbols in the second group, wherein the preprocessing utilizes a priori information for the symbols in the second group that are not yet detected,
- detect symbols in the first group after preprocessing the symbols in the first group,
- preprocess symbols in the second group, wherein the preprocessing utilizes a posteriori information obtained from the detected symbols in the first group, and
- detect symbols in the second group after preprocessing the symbols in the second group; and
- a memory coupled to the at least one processor.

* * * * *